United States Patent
Tokushima et al.

(10) Patent No.: US 12,434,190 B2
(45) Date of Patent: Oct. 7, 2025

(54) DRAW SOLUTE, DRAW SOLUTION, AND WATER TREATMENT DEVICE

(71) Applicants: Nippon Shokubai Co., Ltd., Osaka (JP); Trevi Systems Inc., Rohnert Park, CA (US)

(72) Inventors: Hiroki Tokushima, Suita (JP); Akitoshi Matono, Suita (JP); John Webley, Rohnert Park, CA (US)

(73) Assignees: Nippon Shokubai Co., Ltd., Osaka (JP); Trevi Systems Inc., Rohnert Park, CA (US)

( * ) Notice: Subject to any disclaimer, the term of this patent is extended or adjusted under 35 U.S.C. 154(b) by 220 days.

(21) Appl. No.: 17/916,931

(22) PCT Filed: Apr. 7, 2021

(86) PCT No.: PCT/JP2021/014719
§ 371 (c)(1),
(2) Date: Oct. 4, 2022

(87) PCT Pub. No.: WO2021/206116
PCT Pub. Date: Oct. 14, 2021

(65) Prior Publication Data
US 2023/0149854 A1    May 18, 2023

(30) Foreign Application Priority Data

Apr. 8, 2020    (JP) .................................. 2020-069834

(51) Int. Cl.
*B01D 61/00* (2006.01)
*C02F 1/44* (2023.01)
*C08G 65/08* (2006.01)

(52) U.S. Cl.
CPC ............ *B01D 61/005* (2013.01); *C02F 1/445* (2013.01); *C08G 65/08* (2013.01)

(58) Field of Classification Search
CPC .......... B01D 61/005; C02F 1/04; C02F 1/445; C02F 1/44; C08G 65/08
See application file for complete search history.

(56) References Cited

U.S. PATENT DOCUMENTS

| | | | |
|---|---|---|---|
| 2017/0182477 A1 | 6/2017 | Fuchigami et al. | |
| 2019/0224623 A1 | 7/2019 | Fan et al. | |
| 2021/0316250 A1* | 10/2021 | Osato ................. | B01D 61/0021 |

FOREIGN PATENT DOCUMENTS

| | | | |
|---|---|---|---|
| JP | S52-037897 A | 3/1977 | |
| JP | 2016-087504 A | 5/2016 | |
| JP | 2017-148734 A | 8/2017 | |
| JP | 2018-108538 A | 7/2018 | |
| WO | 2015/156404 A1 | 10/2015 | |
| WO | WO-2016130687 A1 * | 8/2016 | ........... B01D 61/002 |
| WO | 2018/045393 A2 | 3/2018 | |
| WO | 2020/044965 A1 | 3/2020 | |
| WO | 2020/045525 A1 | 3/2020 | |

OTHER PUBLICATIONS

International Preliminary Report on Patentability and Written Opinion issued in corresponding International Patent Application No. PCT/JP2021/014719 dated Oct. 20, 2022.
International Search Report issued in corresponding International Patent Application No. PCT/JP2021/014719 dated Jun. 8, 2021.
Extended European Search Report issued in counterpart European Patent Application No. 21784532.0 dated Sep. 29, 2023.

* cited by examiner

*Primary Examiner* — Haidung D Nguyen
(74) *Attorney, Agent, or Firm* — Morgan, Lewis & Bockius LLP

(57) ABSTRACT

A draw solute for the forward osmosis membrane process comprises a random copolymer obtainable by random addition of a monomer containing ethylene oxide and butylene oxide to a compound having one or more hydroxyl groups.

16 Claims, No Drawings

DRAW SOLUTE, DRAW SOLUTION, AND WATER TREATMENT DEVICE

TECHNICAL FIELD

The present invention relates to a draw solute, and a draw solution and a water treatment equipment using the same.

BACKGROUND ART

A forward osmosis membrane process utilizes a phenomenon in which solvent is transferred from the side with lower osmotic pressure to the side with higher osmotic pressure by bringing two solutions having different concentrations into contact with each other via a semipermeable membrane, and can be utilized for the separation of the components of the solution, and the like. As compared with a reverse osmosis membrane process in which pressure is applied to a solution against the osmotic pressure to force the solution to pass through a membrane, the forward osmosis membrane process that performs membrane filtration by utilizing the osmotic pressure is easy to save energy and is expected to be applied to water treatment such as desalination of sea water, wastewater treatment, food concentration, and electricity generation.

When water treatment is performed by using the forward osmosis membrane process, a solution that has higher osmotic pressure (draw solution) than a solution to be subjected to the treatment (solution to be treated) is used to transfer a solvent (water) from the side of the solution to be treated to the side of the draw solution through a semipermeable membrane. Since the solvent needs to be collected from the draw solution thereafter, the draw solution needs to have properties that allow to separate the solvent easily and thus various osmotic pressure inducers (draw solutes) for preparing such a draw solution are examined. For example, Patent Literature 1 proposes a draw solute composed of a block copolymer containing ethylene oxide, propylene oxide, or butylene oxide. Patent Literature 2 proposes a draw solute composed of a linear or branched random, sequential or block copolymer containing ethylene oxide and propylene oxide.

CITATION LIST

Patent Literature

[Patent Literature 1] International Publication No. 2015/156404
[Patent Literature 2] International Publication No. 2018/045393

SUMMARY OF INVENTION

Technical Problem

Incidentally, even when the amount of draw solute in the draw solution is reduced, if the same amount of water can be drawn into the draw solution side, the amount of water obtained per cycle (water production amount) increases, which is desirable, from the viewpoint of energy efficiency, time reduction, and the like. Such properties of the draw solute can be evaluated by the water transport capacity, which is an index indicating the amount of water produced by the draw solute per unit weight.

Accordingly, it is an object of the present invention to provide a draw solute having improved water transport capacity, a draw solution and a water treatment equipment using the same.

Solution to Problem

As a result of intensive studies in view of the above circumstances, the present inventors have completed the inventions shown in [1] to [6] below.
[1] A draw solute for forward osmosis membrane process, comprising a random copolymer obtainable by random addition of a monomer containing ethylene oxide and butylene oxide to a compound having one or more hydroxyl groups.
[2] The draw solute according to [1], wherein a molar ratio of ethylene oxide to butylene oxide is 1:1 to 10:1.
[3] The draw solute according to [1] or [2], wherein the random copolymer has a number average molecular weight of 500 to 10,000.
[4] The draw solute according to any of [1] to [3], wherein a cloud point of a 50% by mass draw solution prepared by dissolving the draw solute in water is 40 to 75° C.
[5] A draw solution comprising the draw solute according to any of [1] to [4].
[6] A water treatment equipment using the draw solution according to [5].

Advantageous Effects of Invention

According to the present invention, a draw solute having improved water transport capacity, and a draw solution and a water treatment equipment using the same can be provided.

DESCRIPTION OF EMBODIMENTS

Hereinafter, an embodiment of the present invention will be described in detail, but the present invention is not limited thereto.
<Draw Solute>

The draw solute of the present embodiment comprises a random copolymer obtainable by random addition of a monomer containing ethylene oxide and butylene oxide to a compound having one or more hydroxyl groups (hereinafter also referred to as a "hydroxyl group-containing compound"). The random copolymer has a structure in which at least an oxyethylene chain derived from ethylene oxide and an oxybutylene chain derived from butylene oxide are randomly bonded to an oxygen atom in a hydroxyl group of a hydroxyl group-containing compound. The random copolymer contained in the draw solute may be one type alone or two or more types. It may also have a structure in which terminal capping is carried out by bonding an oxybutylene group to the terminals of randomly bonded oxyethylene chains and oxybutylene chains.

Examples of the above hydroxyl group-containing compound include water, methanol, ethanol, 1-propanol, 2-propanol, 1-butanol, 2-butanol, 1-pentanol, 3-methyl-1-butanol, 2-methyl-1-butanol, 2,2-dimethyl-1-propanol, 2-pentanol, 3-methyl-2-butanol, 3-pentanol, 1,2-ethanediol, 1,2-propanediol, 1,3-propanediol, 1,2-butanediol, 1,3-butanediol, 1,4-butanediol, 1,2-pentanediol, 1,3-pentanediol, 1,4-pentanediol, 1,5-pentanediol, neopentyl glycol, allyl alcohol, methallyl alcohol, isoprenol, acrylic acid, methacrylic acid, acetic acid, propionic acid, butyric acid, phenol, glycerin, trimethylolpropane, erythritol, pentaerythritol, diglycerol, ditrimethylolpropane, phloroglucinol, sorbitol, sorbitan, glucose, fructose, xylitol, and methyl glucoside. The number of hydroxyl groups in the hydroxyl group-containing compound is preferably two or more, more preferably three or more, and still more preferably three.

The above molar ratio of ethylene oxide to butylene oxide is preferably 1:1 to 10:1, more preferably 2.5:1 to 7.5:1, and still more preferably 3:1 to 5:1. When the molar ratio of ethylene oxide to butylene oxide is within the above range, both osmotic pressure and phase separation properties can be improved.

The above monomer may contain monomers other than ethylene oxide and butylene oxide. Examples of the other monomers include propylene oxide, butyl glycidyl ether, and phenyl glycidyl ether. The content of the other monomers in the monomer is preferably 20 mol % or less, more preferably 10 mol % or less, and still more preferably 5 mol % or less.

In the above random copolymer, the mass ratio of the structural unit derived from the hydroxyl group-containing compound to the structural unit derived from ethylene oxide and butylene oxide (mass of structural unit derived from ethylene oxide and butylene oxide/mass of structural unit derived from hydroxyl group-containing compound) is preferably 1 or more and 110 or less, more preferably 5 or more and 50 or less, and still more preferably 10 or more and 30 or less.

The lower limit of the number average molecular weight of the above random copolymer is preferably 500 or more, more preferably 1250 or more, and even more preferably 1500 or more, from the viewpoint of suppressing leakage of the polymer through the membrane. The upper limit of the number average molecular weight is preferably 10,000 or less, more preferably 5000 or less, and even more preferably 3000 or less, from the viewpoint of viscosity. The weight average molecular weight is preferably 500 to 10000, more preferably 1250 to 7000, and still more preferably 1500 to 5000. The number average molecular weight and the weight average molecular weight can be measured by the method described in Examples.

The content of the component having a number average molecular weight of 500 or less in the above random copolymer is preferably less than 10% by mass, more preferably less than 5% by mass. The content of the component having a number average molecular weight of 1000 or less in the random copolymer is preferably less than 25% by mass, and more preferably less than 10% by mass. When the content of the component is within these ranges, leakage of the draw solute through the forward osmosis membrane can be easily suppressed.

The reaction conditions for random addition of ethylene oxide and butylene oxide to the hydroxyl group-containing compound are not particularly limited other than simultaneous reaction of ethylene oxide and butylene oxide. For example, the hydroxyl group-containing compound and ethylene oxide and butylene oxide may be reacted as they are or after dilution with a solvent as necessary at preferably 0 to 200° C., more preferably 120 to 180° C., and even more preferably 120 to 130° C. In this case, an alkali catalyst such as potassium hydroxide (KOH) or sodium hydroxide (NaOH) may be used as a catalyst. Examples of the solvents include benzene, toluene, xylene, diisopropyl ether, dibutyl ether, tetrahydrofuran, and dioxane. The reaction can be carried out, for example, by adding a catalyst to the hydroxyl group-containing compound and further feeding ethylene oxide and butylene oxide into the reaction system. Ethylene oxide and butylene oxide may be fed simultaneously using separate feed lines, or may be fed as one liquid after mixing ethylene oxide and butylene oxide in an intermediate tank. The feed of each of ethylene oxide and butylene oxide may be divided into a plurality of times, and the feed time of butylene oxide may be shorter than the feed time of ethylene oxide. Note that the reaction rate can be further increased by aging for 1 to 3 hours until sufficient reaction occurs after feeding ethylene oxide and butylene oxide.

After the reaction, it is preferable to add an acid such as acetic acid, phosphoric acid, or lactic acid to neutralize, and remove light impurities such as ethylene glycol contained in the random copolymer under reduced pressure at 0 to 200° C., more preferably 120 to 180° C. The draw solute is preferably stored in a nitrogen atmosphere, and an antioxidant may be added to improve stability. Suitable antioxidants include dibutylhydroxytoluene, butylhydroxyanisole, ascorbic acid, tocopherol, sodium erythorbate, and the like.

The amount of the antioxidant added to the draw solute is preferably 50 ppm by mass or more, and more preferably 200 ppm by mass or more, from the viewpoint of preventing deterioration of physical properties. The upper limit of the addition amount is not particularly limited, and may be, for example, 1000 ppm by mass or less.

When the draw solute of the present embodiment is dissolved in water to prepare a 5% by mass aqueous solution, the pH of the aqueous solution is preferably 2 to 6. When the pH is within this range, deterioration of the antioxidant can be suppressed, and the stability of the draw solute is improved.

The water transport capacity of the draw solute of the present embodiment is preferably 52% or more, more preferably 54% or more, and even more preferably 56% or more. The upper limit of the water transport capacity of the draw solute is not particularly limited, but may be, for example, 75% or less.

When the draw solute of the present embodiment is dissolved in water to prepare a 50% by mass draw solution, the cloud point of the draw solution is preferably 35 to 80° C., and more preferably 40 to 75° C. When the cloud point is within these ranges, the forward osmosis membrane process is easily applied to water treatment using low-temperature exhaust heat of a factory or the like. The cloud point can be measured by, for example, the method described in Examples.

The viscosity (25° C.) of the draw solutes of the present embodiment is preferably 550 mPa·s (cPs) or less, and more preferably 500 mPa·s or less. The viscosity (25° C.) of a 50% by weight draw solution prepared by dissolving the draw solutes of the present embodiment in water is preferably 100 mPa·s or less, and more preferably 50 mPa's or less. When the viscosity is within these ranges, the energy required for transporting the draw solution in the forward osmosis membrane process is decreased, and the cost can be reduced.

The purity of the draw solute of the present embodiment is preferably 80% by mass or more, more preferably 99% by mass or more, from the viewpoint of reduction in transportation cost. The water content in the draw solute of the present embodiment is preferably less than 1% by mass, from the viewpoint of reducing transportation costs.

<Draw Solution>

The draw solution of the present embodiment contains the draw solute. The content of the draw solute is preferably 20 to 100% by mass, more preferably 50 to 100% by mass, and even more preferably 75 to 100% by mass with respect to the total amount of the draw solution.

The above draw solution may contain a solvent. The solvent may be appropriately selected depending on the conditions of the forward osmosis membrane process using a draw solution, and one or two or more solvents selected from water, methanol, ethanol, and the like can be used. It is more preferable to contain the same solvent as the solvent to be treated. The content of the solvent can be, for example, 80 to 0% by mass with respect to the total amount of the draw solution.

The above draw solution may contain draw solutes (other draw solutes) other than the above draw solute, but the content thereof is preferably 20% by mass or less with respect to the total amount of the draw solute. The draw solution is preferably composed of the above draw solute, optional solvents, and optional other draw solutes, and more preferably composed of the above draw solute and the solvent.

The above draw solution preferably has a cloud point (lower critical solution temperature). The cloud point means a temperature at which phase separation occurs by changing the temperature of a transparent or translucent liquid, resulting in an opaque liquid. The draw solution having a cloud point can cause phase separation between the draw solute and the solvent by heating.

The cloud point of the above draw solution can be appropriately adjusted by changing the configuration of the above addition polymer, for example, the addition molar ratio of ethylene oxide and butylene oxide, the number of addition moles, and the like, and a draw solution having an appropriate cloud point can be selected according to the intended use.

For example, when the forward osmosis membrane process is applied to water treatment utilizing low-temperature exhaust heat from factories, it is preferable that the draw solution does not undergo phase separation at a temperature around room temperature at which the forward osmosis membrane treatment is performed, and the draw solution undergoes phase separation at a temperature close to the low-temperature exhaust heat of factories. Suitable cloud points of the draw solution used in such applications vary depending on the concentration of the draw solute in the draw solution, but is, for example, preferably 35 to 80° C., and more preferably 40 to 75° C.

Since low-temperature exhaust heat from factories has conventionally been difficult to utilize and has been regarded as waste heat in many cases, the water treatment using the low-temperature exhaust heat is particularly preferable, from the viewpoint of energy efficiency.

<Forward Osmosis Membrane Process>

In the forward osmosis membrane process, a feed solution (solution to be treated) and a draw solution are brought into contact via a semipermeable membrane, and the solvent is transferred from the feed solution side having lower osmotic pressure to the draw solution side having higher osmotic pressure. Along with the transfer of the solvent, the concentration of the draw solution gradually decreases. Therefore, the draw solute and the solvent contained in the draw solution need to be separated in order to continuously perform the forward osmosis membrane process.

According to the draw solution having a cloud point, the draw solute and the solvent can be phase-separated by heating.

In the forward osmosis membrane process using such a draw solution having a cloud point, for example, the forward osmosis membrane process can be continuously performed by repeating the following treatment.

Each of the feed solution and the draw solution is arranged on one side of the semipermeable membrane and on the other side thereof so as to contact with the semipermeable membrane, thereby moving the solvent from the side of the feed solution to the side of the draw solution through the semipermeable membrane.

The draw solution whose concentration is decreased is taken out and heated to cause phase separation between the draw solute and the solvent.

The draw solute obtained by phase separation is circulated to the above other side again.

The solvent obtained by phase separation is further purified by using, for example, a nanofiltration membrane (NF membrane) to obtain a desired treated object (purified water, and the like).

The temperature at which the forward osmosis membrane treatment is performed is not particularly limited, but is usually around room temperature, and can be, for example, 5 to 40° C.

As the semipermeable membrane used in the forward osmosis membrane process, a conventionally known membrane can be used, but in order to maintain the strength as a membrane, it is preferable to use a combination of a dense active layer, that establish the selective permeability of the membrane, and a porous support layer. Since the support layer is more likely to adsorb fouling than the active layer, it is generally preferable to provide the active layer of the semipermeable membrane on the feed solution (water to be treated) side, from the viewpoint of reducing membrane fouling.

The above draw solution can be applied to various applications utilizing the forward osmosis membrane process. Among them, water treatment equipment and electricity generation equipment are applications in which utilization of a forward osmosis membrane process is expected, and the draw solution can be suitably applied to these applications.

EXAMPLES

Hereinafter, the present invention will be described in more detail with reference to examples. However, the scope of the present invention is not limited to these examples, and changes and implementations within a scope not departing from the purport of the present invention are all included in the technical scope of the present invention. Unless otherwise specified, "%" means "% by mass".

<Synthesis of Polymers>

As shown below, the polymers of Examples 1 to 6 and Comparative Examples 1 to 3 were synthesized. Table 1 shows the core, the arrangement structure, the mass ratio of ethylene oxide to propylene oxide or butylene oxide (EO/PO or EO/BO), the weight average molecular weight, the number average molecular weight, and the viscosity of each polymer. The weight average molecular weight and the number average molecular weight were measured by gel permeation chromatography (GPC) in terms of polystyrene. The equipment and measurement conditions used for the measurement are as follows:

System: GPC system HLC-8320, manufactured by Tosoh Corporation Measurement side column configuration:
Guard column (TSKguardcolumn SuperMP-M, manufactured by Tosoh Corporation)
Two separation columns (TSKgel SuperMultipore HZ-M, manufactured by Tosoh Corporation) connected in series Reference-side column configuration:
Reference column (TSKgel SuperH2000, manufactured by Tosoh Corporation)

Developing solvent: Tetrahydrofuran (Special grade, manufactured by Fujifilm Wako Pure Chemical Corporation)
Flow rate of the developing solvent: 0.35 mL/min
Standard sample: TSK standard polystyrene (PS-oligomer kit, manufactured by Tosoh Corporation)
Column temperature: 40° C.

Example 1

An autoclave was charged with 150.0 g of glycerin and 8.40 g of 50% KOH at room temperature, and then the gas phase was replaced with nitrogen gas, and the pressure was reduced to a gauge pressure of −0.98 MPa while bubbling nitrogen gas at 20 mL/min. Thereafter, the temperature was raised to 125° C., and stirring was performed for 5 hours. After the pressure was raised to 0.20 MPa, the bubbling was stopped, and 440.0 g of ethylene oxide and 160.0 g of butylene oxide were injected over 2 hours, followed by aging for 3 hours.

150.0 g of the intermediate thus obtained was charged into an autoclave at room temperature, and then the gaseous phase was replaced with nitrogen gas to adjust the gauge pressure to 0.20 MPa. While stirring, 497.6 g of ethylene oxide and 181.0 g of butylene oxide were injected over 2 hours, and aging was performed for 3 hours. After the temperature was lowered to 60° C., the pressure was released, and 1.16 g of 85% phosphoric acid was added. The pressure was reduced to a gauge pressure of −0.98 MPa while bubbling nitrogen gas at 20 mL/min, and the mixture was stirred at 125° C. for 3 hours. As a result, the polymer of Example 1 was obtained.

Example 2

An autoclave was charged with 150.0 g of glycerin and 8.40 g of 50% KOH at room temperature, and then the gas phase was replaced with nitrogen gas, and the pressure was reduced to a gauge pressure of −0.98 MPa while bubbling nitrogen gas at 20 mL/min. Thereafter, the temperature was raised to 125° C., and stirring was performed for 5 hours. After the pressure was raised to 0.20 MPa, the bubbling was stopped, and 402.5 g of ethylene oxide and 188.2 g of butylene oxide were injected over 2 hours, followed by aging for 3 hours.

150.0 g of the intermediate thus obtained was charged into an autoclave at room temperature, and then the gaseous phase was replaced with nitrogen gas to adjust the gauge pressure to 0.20 MPa. While stirring, 345.3 g of ethylene oxide and 161.5 g of butylene oxide were injected over 2 hours, followed by aging for 3 hours. After the temperature was lowered to 60° C., the pressure was released, and 1.74 g of 85% phosphoric acid was added. The pressure was reduced to a gauge pressure of −0.98 MPa while bubbling nitrogen gas at 20 mL/min, and the mixture was stirred at 125° C. for 3 hours. As a result, the polymer of Example 2 was obtained.

Example 3

An autoclave was charged with 150.0 g of glycerin and 8.40 g of 50% KOH at room temperature, and then the gas phase was replaced with nitrogen gas, and the pressure was reduced to a gauge pressure of −0.98 MPa while bubbling nitrogen gas at 20 mL/min. Thereafter, the temperature was raised to 125° C., and stirring was performed for 5 hours. After the pressure was raised to 0.20 MPa, the bubbling was stopped, and 402.5 g of ethylene oxide and 205.9 g of butylene oxide were injected over 2 hours, followed by aging for 3 hours.

150.0 g of the intermediate thus obtained was charged into an autoclave at room temperature, and then the gaseous phase was replaced with nitrogen gas to adjust the gauge pressure to 0.20 MPa. While stirring, 325.2 g of ethylene oxide and 166.3 g of butylene oxide were injected over 2 hours, followed by aging for 3 hours. After the temperature was lowered to 60° C., the pressure was released, and 1.70 g of 85% phosphoric acid was added. The pressure was reduced to a gauge pressure of −0.98 MPa while bubbling nitrogen gas at 20 mL/min, and the mixture was stirred at 125° C. for 3 hours. As a result, the polymer of Example 3 was obtained.

Example 4

An autoclave was charged with 150.0 g of glycerin and 8.40 g of 50% KOH at room temperature, and then the gas phase was replaced with nitrogen gas, and the pressure was reduced to a gauge pressure of −0.98 MPa while bubbling nitrogen gas at 20 mL/min. Thereafter, the temperature was raised to 125° C., and stirring was performed for 5 hours. After the pressure was raised to 0.20 MPa, the bubbling was stopped, and 502.3 g of ethylene oxide and 121.2 g of butylene oxide were injected over 2 hours, followed by aging for 3 hours.

150.0 g of the intermediate thus obtained was charged into an autoclave at room temperature, and then the gaseous phase was replaced with nitrogen gas to adjust the gauge pressure to 0.20 MPa. While stirring, 457.9 g of ethylene oxide and 110.4 g of butylene oxide were injected over 2 hours, and aging was performed for 3 hours. Thereafter, 68.0 g of butylene oxide was further injected over 1 hour, and aging was performed for 3 hours. After the temperature was lowered to 60° C., the pressure was released, and 1.16 g of 85% phosphoric acid was added. The pressure was reduced to a gauge pressure of −0.98 MPa while bubbling nitrogen gas at 20 mL/min, and the mixture was stirred at 125° C. for 3 hours. As a result, the polymer of Example 4 was obtained.

Example 5

An autoclave was charged with 150.0 g of glycerin and 8.40 g of 50% KOH at room temperature, and then the gas phase was replaced with nitrogen gas, and the pressure was reduced to a gauge pressure of −0.98 MPa while bubbling nitrogen gas at 20 mL/min. Thereafter, the temperature was raised to 125° C., and stirring was performed for 5 hours. After the pressure was raised to 0.20 MPa, the bubbling was stopped, and 402.5 g of ethylene oxide and 188.2 g of butylene oxide were injected over 2 hours, followed by aging for 3 hours.

After 150.0 g of the polymer thus obtained was charged into an autoclave at room temperature, the gaseous phase was replaced with nitrogen gas and the gauge pressure was adjusted to 0.20 MPa. While stirring, 345.3 g of ethylene oxide and 161.5 g of butylene oxide were injected over 2 hours, followed by aging for 3 hours.

Thereafter, 150.0 g of the polymer obtained in the above step was charged into an autoclave at room temperature, and then the gaseous phase portion was replaced with nitrogen gas to adjust the gauge pressure to 0.20 MPa. While stirring, 62.1 g of ethylene oxide and 38.3 g of butylene oxide were injected over 2 hours, followed by aging for 3 hours. After the temperature was lowered to 60° C., the pressure was released and 0.58 g of 50% lactic acid was added. The pressure was reduced to a gauge pressure of −0.98 MPa while bubbling nitrogen gas at 20 mL/min, and the mixture was stirred at 125° C. for 3 hours. As a result, the polymer of Example 5 was obtained.

Example 6

An autoclave was charged with 150.0 g of ethylene glycol and 8.40 g of 50% KOH at room temperature, and then the gas phase was replaced with nitrogen gas, and the pressure was reduced to a gauge pressure of −0.98 MPa while bubbling nitrogen gas at 20 mL/min. Thereafter, the temperature was raised to 125° C., and stirring was performed for 5 hours. After the pressure was raised to 0.20 MPa, the bubbling was stopped, and 404.6 g of ethylene oxide and 174.3 g of butylene oxide were injected over 2 hours, followed by aging for 3 hours.

After 150.0 g of the polymer thus obtained was charged into an autoclave at room temperature, the gaseous phase was replaced with nitrogen gas and the gauge pressure was adjusted to 0.20 MPa. While stirring, 363.8 g of ethylene oxide and 224.7 g of butylene oxide were injected over 2 hours, followed by aging for 3 hours. After the temperature was lowered to 60° C., the pressure was released, and 2.87 g of 50% lactic acid was added. The pressure was reduced to a gauge pressure of −0.98 MPa while bubbling nitrogen gas at 20 mL/min, and the mixture was stirred at 125° C. for 3 hours. As a result, the polymer of Example 6 was obtained.

Comparative Example 1

An autoclave was charged with 150.0 g of trimethylolpropane at room temperature, and then the gaseous phase portion was replaced with nitrogen gas, and the temperature was raised to 80° C. for dissolution. Thereafter, 8.40 g of 50% KOH aqueous was charged, and the pressure was reduced to a gauge pressure of −0.98 MPa while bubbling nitrogen gas at 20 mL/min. Thereafter, the temperature was raised to 125° C., and stirring was performed for 5 hours. After the pressure was raised to 0.20 MPa, bubbling was stopped, 147.7 g of ethylene oxide and 177.1 g of propylene oxide were injected over 2 hours, followed by aging for 3 hours.

150.0 g of the intermediate thus obtained was charged into an autoclave at room temperature, and then the gaseous phase was replaced with nitrogen gas to adjust the gauge pressure to 0.20 MPa. While stirring, 171.2 g of ethylene oxide and 205.2 g of propylene oxide were injected over 2 hours, followed by aging for 3 hours. After the temperature was lowered to 60° C., the pressure was released, and 2.57 g of 85% phosphoric acid was added. The pressure was reduced to a gauge pressure of −0.98 MPa while bubbling nitrogen gas at 20 mL/min, and the mixture was stirred at 125° C. for 3 hours. As a result, the polymer of Comparative Example 1 was obtained.

Comparative Example 2

An autoclave was charged with 150.0 g of trimethylolpropane at room temperature, and then the gaseous phase portion was replaced with nitrogen gas, and the temperature was raised to 80° C. for dissolution. Thereafter, 8.40 g of 50% KOH aqueous was charged, and the pressure was reduced to a gauge pressure of −0.98 MPa while bubbling nitrogen gas at 20 mL/min. Thereafter, the temperature was raised to 125° C., and stirring was performed for 5 hours. After the pressure was raised to 0.20 MPa, bubbling was stopped, and 658.1 g of ethylene oxide was injected over 2 hours, followed by aging for 3 hours.

500.0 g of the intermediate thus obtained was charged into an autoclave at room temperature, and then the gaseous phase was replaced with nitrogen gas to adjust the gauge pressure to 0.20 MPa. While stirring, 175.4 g of butylene oxide was injected over 2 hours, followed by aging for 3 hours. After lowering the temperature to 60° C., the pressure was released, and 5.19 g of 85% phosphoric acid was added. The pressure was reduced to a gauge pressure of −0.98 MPa while bubbling nitrogen gas at 20 mL/min, and the mixture was stirred at 125° C. for 3 hours. As a result, the polymer of Comparative Example 2 was obtained.

Comparative Example 3

An autoclave was charged with 150.0 g of glycerin and 8.40 g of 50% KOH at room temperature, and then the gas phase was replaced with nitrogen gas, and the pressure was reduced to a gauge pressure of −0.98 MPa while bubbling nitrogen gas at 20 mL/min. Thereafter, the temperature was raised to 125° C., and stirring was performed for 5 hours. After the pressure was raised to 0.20 MPa, bubbling was stopped, and 502.3 g of ethylene oxide was injected over 2 hours, followed by aging for 3 hours.

150.0 g of the intermediate thus obtained was charged into an autoclave at room temperature, and then the gaseous phase was replaced with nitrogen gas to adjust the gauge pressure to 0.20 MPa. While stirring, 369.0 g of ethylene oxide was injected over 2 hours, and aging was performed for 3 hours. Thereafter, 226.3 g of butylene oxide was further injected over 2 hours, and aging was performed for 3 hours. After the temperature was lowered to 60° C., the pressure was released, and 1.97 g of 85% phosphoric acid was added. The pressure was reduced to a gauge pressure of −0.98 MPa while bubbling nitrogen gas at 20 mL/min, and the mixture was stirred at 125° C. for 3 hours. As a result, the polymer of Comparative Example 3 was obtained.

| Entry | Core | Arrangement structure | EO/PO | EO/BO | Weight average molecular weight | Number average molecular weight | Viscosity (mPa · s) |
|---|---|---|---|---|---|---|---|
| Example 1 | Glycerin | Random | — | 4.5 | 3000 | 2000 | 490 |
| Example 2 | Glycerin | Random | — | 3.5 | 2800 | 1900 | 450 |
| Example 3 | Glycerin | Random | — | 3.2 | 2800 | 1900 | 450 |
| Example 4 | Glycerin | Random | — | 4.5 | 3000 | 2000 | 490 |

-continued

| Entry | Core | Arrangement structure | EO/PO | EO/BO | Weight average molecular weight | Number average molecular weight | Viscosity (mPa · s) |
|---|---|---|---|---|---|---|---|
| Example 5 | Glycerin | Random | — | 3.1 | 4500 | 2500 | 750 |
| Example 6 | Ethylene glycol | Random | — | 2.8 | 2000 | 1500 | 250 |
| Comparative Example 1 | Trimethylolpropane | Random | 1.1 | — | 2000 | 1900 | 320 |
| Comparative Example 2 | Trimethylolpropane | Block | — | 3.8 | 1500 | 1200 | 150 |
| Comparative Example 3 | Glycerin | Block | — | 3.5 | 2800 | 1900 | 550 |

<Evaluation 1>

The polymers produced in Examples and Comparative Examples were subjected to osmotic pressure evaluation, phase separation evaluation, viscosity evaluation, cloud point evaluation, and water transport capacity evaluation by the following methods. The results are shown in Table 2.

(Osmotic Pressure Evaluation)

Aqueous solutions containing 40% by mass, 50% by mass or 60% by mass of each polymer were prepared, and the osmotic pressure was measured using a vapor pressure osmometer (5600, manufactured by WESCOR). Each measurement was performed three times, and the average value thereof was taken as the osmotic pressure (osmol: Osm). The osmotic pressure (osmole) obtained was converted into osmotic pressure (bar) by the following equation.

$$\text{Osmotic pressure (bar)} = \text{osmotic pressure (Osm)} \times 8.314 \times 298.15 / 100000$$

(Evaluation of Phase Separation Property)

An aqueous solution containing 50% by mass of each polymer was prepared and sealed in a screw vial. This was allowed to stand in an oven at 97° C. overnight to be sufficiently equilibrated, and then about 1 g of the upper layer (water-rich phase) and about 0.2 g of the lower layer (polymer-rich phase) were sampled at three points each and placed on an aluminum cup. The aluminum cup was left to stand in an oven at 97° C. for 2 hours for drying, and the polymer concentrations of the upper layer and lower layer were calculated from the weight difference before and after drying.

(Viscosity Evaluation)

The viscosity at 25° C. was measured using a B-type viscometer (TVB-10, manufactured by Toki Sangyo Co., Ltd.).

(Cloud Point Evaluation)

An aqueous solution containing 50% by mass of each polymer was prepared and sealed in a screw vial. This was allowed to stand in an oven at 97° C. for 1 hour to separate layers, then cooled while measuring the internal temperature, and the temperature at which a visually uniform layer was formed was taken as the cloud point.

(Evaluation of Water Transport Capacity)

The water transport capacity was calculated by the following equation:

Water Transport Capacity=<Water Passing Weight>/<Polymer Weight>×100=(<Weight after Water Passage>−<Initial Weight>)/<Polymer Weight>×100=(<Weight after Water Passage>−<Polymer Concentration after Passing Water>/<Initial Polymer Concentration>×<Weight after Passing Water>/(<Weight after Passing Water>×<Polymer Concentration after Water Passage>)×100= (<Initial Polymer Concentration>−<Polymer Concentration after Passing Water>/(<Initial Polymer Concentration>×<Polymer Concentration after Water Passage)×100

In the equation, "Initial Polymer Concentration" indicates the concentration of the lower layer (polymer-rich phase) in the phase separation evaluation, and "Polymer Concentration after Water Passage" is the polymer concentration when the osmotic pressure becomes 48 bar, and was calculated by back calculation from the correlation equation of the osmotic pressure at a polymer concentration of 40 to 60% by mass measured in the osmotic pressure evaluation.

TABLE 2

| Entry | Cloud point [° C.] | Concentration after separation (upper layer) [%] | Concentration after separation (lower layer) [%] | Osmotic Pressure [bar] (40% by mass) | Osmotic Pressure [bar] (50% by mass) | Osmotic Pressure [bar] (60% by mass) | Initial polymer concentration [%] | Polymer concentration after water passage [%] | Water transport capacity [%] |
|---|---|---|---|---|---|---|---|---|---|
| Example 1 | 75 | 2.9 | 68.5 | 27.6 | 49.8 | 82.9 | 68.5 | 49.2 | 57 |
| Example 2 | 65 | 1.2 | 77.1 | 22.2 | 39.3 | 65.3 | 77.1 | 53.3 | 58 |
| Example 3 | 60 | 1.4 | 77.8 | 19.2 | 35.2 | 60.2 | 77.8 | 55.1 | 53 |
| Example 4 | 75 | 2.4 | 69.8 | 26.7 | 48.7 | 89.7 | 69.8 | 49.7 | 58 |
| Example 5 | 55 | 0.5 | 84.0 | 17.2 | 29.9 | 53.6 | 84.0 | 57.6 | 54 |
| Example 6 | 62 | 2.2 | 80.0 | 23.2 | 38.2 | 62.4 | 80.0 | 54.0 | 60 |
| Comparative Example 1 | 65 | 0.4 | 82.1 | 19.6 | 32.7 | 50.7 | 82.1 | 58.5 | 49 |
| Comparative Example 2 | 60 | 5.9 | 69.2 | 22.8 | 36.7 | 57.7 | 69.2 | 55.4 | 36 |

TABLE 2-continued

| Entry | Cloud point [° C.] | Concentration after separation (upper layer) [%] | Concentration after separation (lower layer) [%] | Osmotic Pressure [bar] (40% by mass) | Osmotic Pressure [bar] (50% by mass) | Osmotic Pressure [bar] (60% by mass) | Initial polymer concentration [%] | Polymer concentration after water passage [%] | Water transport capacity [%] |
|---|---|---|---|---|---|---|---|---|---|
| Comparative Example 3 | 65 | 0.9 | 73.5 | 20.6 | 37.3 | 68.7 | 73.5 | 53.4 | 51 |

<Evaluation 2>

(Evaluation of Membrane Performance)

Evaluation of membrane flux in forward osmosis mode was performed on a driving solution containing the polymer of Example 2 according to the following test procedure. Membrane flux was measured by a Membrane Testing Fixture (Model II) designed and manufactured by Trevi Systems and a Toyobo cellulose triacetate (CTA) hollow fiber FO module was utilized as the semi-permeable membrane. Deionized water, a 4.5% NaCl aqueous solution, and a 7.5% NaCl aqueous solution were supplied as subject solutions, and a 75% driving compound (polymer of Example 2) aqueous solution was used as a driving solution. The liquid temperature of the driving solution was adjusted to five temperatures of 25° C., 33° C., 37° C., 41° C., and 45° C., and the test was performed at each temperature. The volumetric flow rates of the subject solution and the draw solution were selected to be close to the flow rates in commercial 5-inch and 10-inch hollow fiber membrane elements. The driving solution was directed towards the active layer of the hollow fibers (PRO mode). Both the subject solution and the driving solution were circulated in a closed loop for at least 4 hours. Water flux and reverse solute diffusion were measured at a run time of 4 hours. The results are summarized in Table 3.

TABLE 3

| Subject solution | Driving compound (polymer) | Flux density (LMH) | | | | |
|---|---|---|---|---|---|---|
| | | 25° C. | 33° C. | 37° C. | 41° C. | 45° C. |
| 4.5% NaCl aqueous solution | Example 2 | 1.61 | 1.36 | 1.20 | 1.00 | 0.79 |
| 7.5% NaCl aqueous solution | Example 2 | 0.86 | 0.62 | 0.45 | 0.25 | 0.10 |

As is clear from Table 3, in case where the polymer of Example 2 was used as a driving compound, transfer of water from the subject solution side to the driving solution side was observed under any conditions, and it was confirmed that high water permeability could be exhibited.

The invention claimed is:

1. A draw solute for the forward osmosis membrane process, the draw solute comprising a random copolymer obtainable by random addition of a monomer containing ethylene oxide and butylene oxide to a compound having two or more hydroxyl groups, wherein a molar ratio of ethylene oxide to butylene oxide is 2.5:1 to 5:1.

2. The draw solute according to claim 1, wherein the random copolymer has a number average molecular weight of 500 to 10000.

3. The draw solute according to claim 1, wherein a cloud point of a 50% by mass draw solution prepared by dissolving the draw solute in water is 40 to 75° C.

4. The draw solute according to claim 2, wherein a cloud point of a 50% by mass draw solution prepared by dissolving the draw solute in water is 40 to 75° C.

5. The draw solute according to claim 1, wherein the random copolymer is obtainable by random addition of the monomer containing ethylene oxide and butylene oxide to a compound having three or more hydroxyl groups.

6. The draw solute according to claim 1, wherein the draw solute is dissolved in water to prepare a 5% by mass aqueous solution, the pH of the aqueous solution is 2 to 6.

7. The draw solute according to claim 1, comprising antioxidant in an amount of 50 ppm by mass or more and 1000 ppm by mass or less.

8. The draw solute according to claim 1, wherein a content of the monomers other than ethylene oxide and butylene oxide is 20 mol % or less.

9. The draw solute according to claim 1, wherein a mass ratio of a structural unit derived from the hydroxyl group-containing compound to a structural unit derived from ethylene oxide and butylene oxide is 1 or more and 110 or less.

10. The draw solute according to claim 1, wherein said draw solute has a water transport capacity of 52% or more.

11. The draw solute according to claim 1, wherein a molar ratio of ethylene oxide to butylene oxide is 2.8:1 to 4.5:1.

12. A draw solution comprising the draw solute according to claim 1.

13. A water treatment equipment using the draw solution according to claim 12.

14. A draw solution comprising the draw solute according to claim 2.

15. A draw solution comprising the draw solute according to claim 3.

16. A draw solution comprising the draw solute according to claim 4.

* * * * *